United States Patent [19]

Klingensmith

[11] Patent Number: 5,149,733
[45] Date of Patent: Sep. 22, 1992

[54] STABILIZED POLYMERS

[75] Inventor: George B. Klingensmith, Houston, Tex.

[73] Assignee: Shell Oil Company, Houston, Tex.

[21] Appl. No.: 382,380

[22] Filed: Jul. 20, 1989

[51] Int. Cl.$^5$ ................................................. C08K 5/36
[52] U.S. Cl. .................................... 524/331; 524/495; 524/496
[58] Field of Search ............... 524/495, 496, 331; 528/392

[56] References Cited

U.S. PATENT DOCUMENTS

| | | | |
|---|---|---|---|
| 2,985,617 | 5/1961 | Salyer et al. | 524/331 |
| 3,057,926 | 10/1962 | Coffield | 524/331 |
| 3,676,401 | 7/1972 | Henry | 523/126 |
| 3,694,412 | 9/1972 | Nozaki | 260/63 |
| 3,753,952 | 8/1973 | Guillet | 523/125 |
| 3,929,727 | 12/1975 | Russell et al. | 260/45.95 F |
| 4,024,104 | 5/1977 | Russell et al. | 260/45.8 R |
| 4,024,325 | 5/1977 | Hudgin | 528/392 |
| 4,798,884 | 1/1989 | Brons et al. | 528/392 |
| 4,824,910 | 4/1989 | Lutz | 525/185 |
| 4,851,470 | 7/1989 | George | 528/392 |

FOREIGN PATENT DOCUMENTS 121965 10/1984 European Pat. Off. .
257663  3/1988 European Pat. Off. .

OTHER PUBLICATIONS

E. Kovacs and Z. Wolkober: J. Polymer Science: Symposium No. 57, 171–180 (1976).
Gerald Scott: *Developments in Polymer Stabilization*-5, 71–83 (1982).

*Primary Examiner*—Veronica P. Hoke
*Attorney, Agent, or Firm*—Denise Y. Wolfs

[57] ABSTRACT

Linear alternating polymers of carbon monoxide and at least one ethylenically unsaturated hydrocarbon are stabilized against degradation caused by exposure to ultraviolet light by the inclusion therein of a thiobisphenol and certain channel-type carbon blacks.

22 Claims, No Drawings

STABILIZED POLYMERS

FIELD OF INVENTION

This invention relates to certain stabilized compositions comprising a linear alternating polymer of carbon monoxide and at least one ethylenically unsaturated hydrocarbon. More particularly, the invention relates to such polymer compositions which are stabilized against the detrimental effects of ultraviolet light by the incorporation therein of a particular mixture as stabilizer.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium as catalyst. Nozaki extended the reaction to produce linear alternating polymers in the presence of alkylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, now becoming known as polyketones or polyketone polymers, has become of greater interest in part because of the greater availability of the polymers. More recent processes for the production of the polyketone polymers are illustrated by a number of published European Patent Applications including 121,965, 181,014, 213,671 and 257,633. The process, now considered conventional, generally involves the use of a catalyst formed from a Group VIII metal selected from palladium, cobalt or nickel, the anion of a non-hydrohalogenic acid having a pKa below about 6, preferably below 2, and a bidentate ligand of phosphorous, arsenic or antimony.

The resulting polymers are relatively high molecular weight materials having established utility as premium thermoplastics in the production of shaped articles by methods conventional for the processing of thermoplastics. Although the polymers are relatively stable, the linear alternating polymers do undergo to some degree the degradation caused by exposure to ultraviolet light and elevated temperature characteristic of most if not all organic polymers.

Russell et al, U.S. Pat. No. 3,929,729 and U.S. Pat. No. 4,024,104 teach the use of certain benzophenones and benzotriazines as thermal stabilizers for certain polymers of carbon monoxide and ethylene with the optional presence of third monomers. Although the scope of the disclosed polymers is rather broad the scope of polymers tested is rather narrow and the Russell et al teachings do not appear to be directed toward linear alternating polymers. In copending U.S. patent application Ser. No. 167,801, filed Mar. 14, 1988, there is disclosed a class of stabilizers useful to retard degradation of the linear alternating polymers of carbon monoxide and at least one ethylenically unsaturated hydrocarbon. Copending U.S. patent application Ser. No. 343,770, filed Apr. 27, 1989 discloses a synergistic combination of a diphenylamine and a particular type of channel-type carbon black to retard the degradation caused by exposure to ultraviolet light. It would be of advantage, however, to provide an additional stabilizer package useful in preventing degradation of a linear alternating polymer of carbon monoxide and at least one ethylenically unsaturated hydrocarbon upon exposure to ultraviolet light.

SUMMARY OF THE INVENTION

The present invention provides polymer compositions stabilized against degradation resulting from exposure to ultraviolet light and to a method for producing such stabilized compositions. More particularly, the invention provides compositions comprising a linear alternating polymer of carbon monoxide and at least one ethylenically unsaturated hydrocarbon, which compositions are stabilized against degradation caused by exposure to ultraviolet light by incorporation therein of a synergistic mixture of carbon black of particular properties and a thiobisphenol.

DESCRIPTION OF THE INVENTION

The compositions of the invention comprise linear alternating polymers of carbon monoxide and at least one ethylenically unsaturated hydrocarbon which are stabilized against the degradation resulting from exposure to ultraviolet light by the incorporation therein of a combination of a particular type of channel-type carbon black and a thiobisphenol having at least one bulky aromatic ring substituent on a ring carbon atom ortho to each phenolic hydroxyl group. The ethylenically unsaturated hydrocarbons useful as precursors of the polyketone polymers have up to 20 carbon atoms inclusive, preferably up to 10 carbon atoms inclusive, and are aliphatic such as ethylene and other $\alpha$-olefins including propylene, 1-butene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of unsaturated hydrocarbons is styrene, p-methylstyrene, p-ethylstyrene and m-isopropylstyrene. The preferred polyketone polymers are copolymers of carbon monoxide and ethylene or terpolymers of carbon monoxide, ethylene and a second hydrocarbon of at least 3 carbon atoms, particularly an $\alpha$-olefin such as propylene.

The structure of the polyketone polymers is that of a linear alternating polymer of carbon monoxide and at least one ethylenically unsaturated hydrocarbon and the polymer will contain substantially one molecule of carbon monoxide for each molecule of hydrocarbon. When the preferred terpolymers of carbon monoxide, ethylene and a second hydrocarbon are employed in the compositions of the invention there will be at least about two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

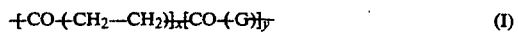  (I)

wherein G is the moiety of the second unsaturated hydrocarbon of at least 3 carbon atoms polymerized through the ethylenic unsaturation. The —CO—(CH$_2$—CH$_2$) units and the —CO—(G— units are formed randomly throughout the polymer chain and the ratio of y:x is no more than about 0.5. In the modification of the invention where copolymers of carbon monoxide and ethylene are employed there will be no second hydrocarbon and the copolymers are represented by the above formula I wherein y is 0. When y is other than 0, i.e., terpolymers are employed, preferred ratios of y:x are from about 0.01 to about 0.1. The end groups or "caps" of the polymer chain will depend upon what materials are present during the production of the polyketone polymer and how or whether the polymer has been purified. The precise nature of the end groups does not appear to be of any particular significance so far as the overall properties of the polymer are concerned so that the polymers are fairly represented by the formula for the polymer chain as depicted above.

Of particular interest are the polymers of number average molecular weight from about 1000 to about 200,000, particularly those polymers of number average molecular weight from about 20,000 to about 90,000 as determined by gel permeation chromatography. The physical properties of the polymers will depend in part upon the molecular weight of the polymer, whether the polymer is a copolymer or a terpolymer and in the case of terpolymers the nature of and the proportion of the second hydrocarbon present. Typical melting points for the polymers are from about 175° C. to about 300° C., more frequently from about 210° C. to about 270° C. The polymers will have a limiting viscosity number (LVN), expressed as dl/g and measured in m-cresol at 60° C., of from about 0.5 to about 10, preferably from about 0.8 to about 4.

The polymers are produced by the general methods of the above published European Patent Applications. The method of production which is now becoming conventional is to contact the carbon monoxide and hydrocarbon in the presence of a catalyst composition formed from a palladium salt, the anion of a non-hydrohalogenic acid having a pKa below about 6 and a bidentate ligand of phosphorous. The scope of the process of polyketone production is extensive but, without wishing to be limited, a preferred catalyst composition is formed from a palladium carboxylate, particularly palladium acetate, the anion of trifluoroacetic acid or p-toluenesulfonic acid and a bidentate ligand of phosphorous selected from 1,3-bis(diphenylphosphino)propane or 1,3-bis[di(2-methoxyphenyl)phosphino]propane.

Polymerization is conducted in the liquid phase in the presence of a reaction diluent such as an alkanol, e.g., methanol or ethanol, or a lower alkanone, e.g., acetone. The reactants are contacted under polymerization conditions in the presence of the catalyst composition by conventional methods such as shaking or stirring in a suitable reaction vessel. Polymerization conditions include reaction temperatures from about 20° C. to about 150° C., preferably from about 50° C. to about 135° C. Typical reaction pressures are from about 1 bar to about 200 bar, but pressures from about 10 bar to about 100 bar are preferred. Subsequent to the desired reaction the polymerization is terminated by cooling the reactor and contents and releasing the pressure. The polymer product is typically insoluble in the product mixture and is recovered by conventional methods such as filtration or decantation. The polymer is used as recovered or is purified, if desired, by contacting the polymer with a solvent or complexing agent selective for catalyst composition residues.

The polyketone polymers are stabilized against degradation caused by exposure to ultraviolet light by incorporation therein of a combination of a thiobisphenol wherein each phenolic hydroxyl group is sterically hindered and a particular channel-type carbon black.

The thiobisphenol component of the stabilizer is a compound having two 4-hydroxyphenyl groups connected by a sulfur atom, each of which hydroxyl groups is sterically hindered by the presence of a bulky substituent on at least one carbon atom ortho to the ring carbon atom on which the hydroxyl group is substituted. A preferred class of thiobisphenols is represented by the formula

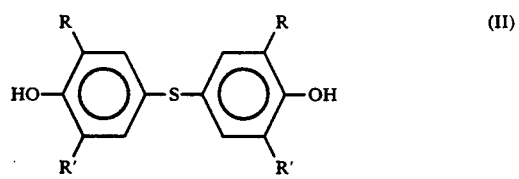

wherein R independently is secondary or tertiary alkyl of from 3 to 8 carbon atoms inclusive, preferably from 3 to 5 carbon atoms, and R' independently is alkyl of up to 8 carbon atoms inclusive. Illustrative of suitable R groups are isopropyl, sec-butyl, t-butyl, sec-amyl and t-amyl. R' groups are branched or are straight chain alkyl groups, e.g., methyl, ethyl, isopropyl, t-butyl, 2-hexyl or octyl. In preferred embodiments of the thiobisphenol, however, each R' group is R. Suitable thiobisphenol components of the compositions of the invention include di(4-hydroxy-3-methyl-5-t-butylphenyl)sulfide, bis(4-hydroxy-3,5-di-t-butylphenyl)sulfide and bis(4-hydroxy-3,5-di-sec-amylphenyl)sulfide. Preferred as the thiobisphenol component is bis(4-hydroxy-3,5-di-t-butylphenyl)sulfide.

The carbon black employed as a component of the stabilizer is a channel-type carbon black of particular properties. The term carbon black is generic for a class of finely divided carbonaceous products resulting from pyrolysis of hydrocarbon gases or oils. Carbon blacks typically have particle sizes in the range of from about 100 Å to 5000 Å and surface areas of from about 6 m²/g. The carbon content ranges from about 83% to about 99%. Channel-type carbon blacks result when natural gas with or without oil vapors is burned in a multitude of small flames which impinge on a channel surface by methods well known in the art of manufacturing carbon blacks. Certain of the channel-type carbon blacks containing sulfur result from burning of a gas/oil mixture which has some sulfur present. The channel carbon blacks are among the most finely divided carbon blacks with particle sizes generally less than 500 Å, e.g., from about 100 Å to about 450 Å. When a channel-type carbon black has the property of being weakly acidic, it is effective in the stabilizer mixtures of the invention. Other forms of carbon black which are more acidic, neutral or weakly basic do not prove effective in combination with the thiobisphenol and impart only mirror photoprotection through the screening out of incident ultraviolet radiation. The weakly acidic channel-type carbon blacks effective in the mixtures of the invention show a pH of from about 3.5 to about 6.5, preferably from about 4 to about 5. The precise role of pH in the chemistry of photostabilization is not known with certainty but the chemistry of aliphatic ketones is often sensitive to pH, showing bell-shaped or inverted bell-shaped responses in reaction rates influenced by pH. The production of such weakly acidic, channel-type carbon black is known in the art and certain of the carbon blacks of this type are commercial, e.g., the PRINTEX®140 carbon black marketed by Degussa.

The mixture of the thiobisphenol and the carbon black is employed in a stabilizing quantity. The thiobisphenol is provided in an amount from about 0.01% by weight to about 10% by weight based on the polymer to be stabilized. Amounts of thiobisphenol from about 0.05% by weight to about 3% by weight on the same basis are preferred. The carbon black is employed in a quantity of from about 0.5% by weight to about 10% by weight based on total polymer to be stabilized although quantities of from about 1% by weight to about 5% by weight on the same basis are preferred.

The thiobisphenol and the carbon black components of the stabilizer are added to the polymer by conventional methods suitable for forming an intimate mixture of the polymer and the UV stabilizer components. Such methods include dry blending of the polymer and the stabilizer components in a finely divided form followed by hot pressing or by extrusion of the mixture. Alternatively, the stabilized composition is formed by blending the components in a mixer operating at high shear. The stabilizer components are preferably added to the polymer at the same time but satisfactory results are obtained when the stabilizer mixture components are added separately. The stabilized composition may also include other components such as antioxidants, colorants, plasticizers, reinforcements and dyes which are added to the polymer together with or separately from the UV stabilizer components.

The stabilized polyketone compositions are useful in the manufacture of fibers, sheets, films, laminates, containers and wire and cables of established utility which are produced by conventional methods such as melt-spinning, extrusion, injection molding and thermoforming. The compositions are particularly useful in applications where the finished product is likely to be exposed directly to ultraviolet light such as structural parts used in construction or parts produced for external automotive applications.

The invention is further illustrated by the following Illustrative Embodiments which should not be construed as limiting the invention.

ILLUSTRATIVE EMBODIMENT I

A terpolymer of carbon monoxide, ethylene and propylene was produced in the presence of a catalyst formed from palladium acetate, trifluoroacetic acid and 1,3-bis[di(2-methoxyphenyl)phosphino]propane. This polymer had a melting point of 219° C. and an LVN, measured in m-cresol at 60° C., of 1.72 dl/g.

ILLUSTRATIVE EMBODIMENT II

Samples were produced comprising the polymer of Illustrative Embodiment I, 0.5% by weight, based on total polymer, of bis(4-hydroxy-3,5-di-t-butylphenyl)-sulfide and 3% by weight, based on total polymer of Printex 140 ®, a commercial channel-type carbon black marketed by Degussa. The samples were prepared by mixing the components and hot pressing test specimens of 0.010 inch in thickness. The specimens were subjected to diurnal UV-A irradiation in air at 40° C. and periodically a sample was withdrawn and evaluated by ZGL tensile testing.

The ZGL procedure employs a testing device which includes a pneumatic drive, a piezoelectric transducer, automatic data acquisition and analysis and user friendly software and reporting. An environmental chamber controls the relative humidity and temperature during testing. The ends of a notched test specimen are separated at a constant rate, e.g., at speeds up to 5000 in/min, to give failure times of 100-500 m sec. Local strain rates are produced in the ZGL test specimens which are comparable to those in the first incremental deformation at the notch during a conventional Izod test. In the ZGL version of the notched Izod, the selected velocity is maintained throughout the test which makes the ZGL test more severe than the conventional notched Izod. Thus, the values obtained are somewhat lower than conventional values but are valid for comparison of toughness among various materials. In the Table which follows, the composition produced above is tested and compared with the unstabilized polymer and terpolymer plus Printex 140 ® in terms of loss of roughness. In each case, the ZGL impact in kg/m² was measured as a function of time.

TABLE I

| Sample | ZGL Impact | | | |
|---|---|---|---|---|
| | 0 hrs | 5 hrs | 15 hrs | 24 hrs |
| Terpolymer | 37.5 | 17 | 3 | 1 |
| Stabilized Composition | 43 | 59 | 32 | 20 |
| Terpolymer plus Printex 140 ® | 47.5 | 58 | 23 | 2.5 |

ILLUSTRATIVE EMBODIMENT III

By a procedure substantially similar to that of Illustrative Embodiment I, a linear alternating terpolymer of carbon monoxide, ethylene and propylene was produced which had a melting point of 221° C. and an LVN, measured in m-cresol at 60° C. of 1.88 dl/g. By the procedure of Illustrative Embodiment II, specimens were produced and evaluated of the terpolymer and the terpolymer plus 0.5% by weight of bis(4-hydroxy-3,5-di-t-butylphenyl)sulfide. The results are shown in Table II.

TABLE II

| Sample | ZGL Impact | | |
|---|---|---|---|
| | 0 hrs | 8 hrs | 16 hrs |
| Terpolymer | 45.5 | 1.0 | 0.5 |
| Terpolymer plus thiobisphenol | 23.5 | 2.0 | 1.0 |

What is claimed is:

1. A composition stabilized against degradation caused by exposure to ultraviolet light which comprises a linear alternating polymer of carbon monoxide and at least one ethylenically unsaturated hydrocarbon, and a stabilizing quantity of a mixture of a weakly acidic channel-type carbon black, which shows a pH from about 3.5 to about 6.5, and a thiobisphenol, wherein the thiobisphenol is of the formula

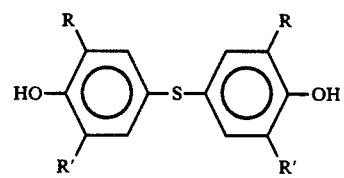

wherein R independently is secondary or tertiary alkyl of from 3 to 8 carbon atoms inclusive, and R' independently is alkyl of up to 8 carbon atoms inclusive.

2. A method of stabilizing a linear alternating polymer of carbon monoxide and at least one ethylenically unsaturated hydrocarbon against degradation caused by exposure to ultraviolet light which comprises incorporating therein a stabilizing quantity of a mixture of a weakly acidic channel-type carbon black, which shows a pH from about 3.5 to 6.5, and a thiobisphenol, wherein the thiobisphenol is of the formula

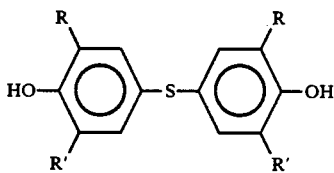

wherein R is independently is secondary or tertiary alkyl of from 3 to 8 carbon atoms inclusive, and R' independently is alkyl of up to 8 carbon atoms inclusive.

3. The composition of claim 1 wherein the polymer is represented by the repeating formula

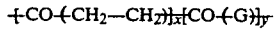

wherein G is the moiety of an ethylenically unsaturated hydrocarbon of at least 3 carbon atoms polymerized through the ethylenic unsaturation and the ratio of y:x is no more than about 0.5.

4. The composition of claim 3 wherein the carbon black is present in a quantity of from about 0.5% by weight to about 10% by weight, based on total polymer.

5. The composition of claim 4 wherein R' is R.

6. The composition of claim 5 wherein the thiobisphenol is present in a quantity of from about 0.01% by weight to about 10% by weight, based on total polymer.

7. The composition of claim 6 wherein y is 0.

8. The composition of claim 7 wherein R is t-butyl.

9. The composition of claim 6 wherein the ratio of y:x is from about 0.01 to about 0.1.

10. The composition of claim 9 wherein G is a moiety of propylene.

11. The composition of claim 10 wherein R is t-butyl.

12. The composition of claim 11 wherein the thiobisphenol is present in an amount of from about 0.05% by weight to about 3% by weight, the carbon black is present in a quantity of from about 1% by weight to about 5% by weight and the carbon black has a pH from about 4 to about 5.

13. The method of claim 2 wherein the polymer is represented by the repeating formula

wherein G is the moiety of an ethylenically unsaturated hydrocarbon of at least 3 carbon atoms polymerized through the ethylenic unsaturation and the ratio of y:x is no more than about 0.5.

14. The method of claim 13 wherein the carbon black is present in a quantity of from about 0.5% by weight to about 10% by weight, based on total polymer.

15. The method of claim 14 wherein R' is R.

16. The method of claim 15 wherein the thiobisphenol is present in a quantity of from about 0.01% by weight to about 10% by weight, based on total polymer.

17. The method of claim 16 wherein y is 0.

18. The method of claim 17 wherein R is t-butyl.

19. The method of claim 16 wherein the ratio of y:x is from about 0.01 to about 0.1.

20. The method of claim 19 wherein G is a moiety of propylene.

21. The method of claim 20 wherein R is t-butyl.

22. The method of claim 21 wherein the thiobisphenol is present in an amount of from about 0.05% by weight to about 3% by weight, the carbon black is present in a quantity of from about 1% by weight to about 5% by weight, and the carbon black has a pH from about 4 to about 5.

* * * * *